United States Patent
Myllynen et al.

(10) Patent No.: US 8,243,636 B2
(45) Date of Patent: Aug. 14, 2012

(54) MESSAGING SYSTEM AND SERVICE

(75) Inventors: Harri Myllynen, Helsinki (FI); Pasi Leino, London (GB); Antti Ohrling, London (GB)

(73) Assignee: Apple Inc., Cupertino, CA (US)

( * ) Notice: Subject to any disclaimer, the term of this patent is extended or adjusted under 35 U.S.C. 154(b) by 837 days.

(21) Appl. No.: 10/555,543

(22) PCT Filed: May 6, 2004

(86) PCT No.: PCT/GB2004/001953
§ 371 (c)(1),
(2), (4) Date: Mar. 6, 2006

(87) PCT Pub. No.: WO2004/100470
PCT Pub. Date: Nov. 18, 2004

(65) Prior Publication Data
US 2006/0194595 A1     Aug. 31, 2006

(30) Foreign Application Priority Data

| | | |
|---|---|---|
| May 6, 2003 | (GB) | 0310366.0 |
| May 20, 2003 | (GB) | 0311592.0 |
| Jul. 8, 2003 | (GB) | 0315984.5 |

(51) Int. Cl.
*H04B 7/00*     (2006.01)
(52) U.S. Cl. ............... 370/310; 455/466; 455/412.2; 455/412.1
(58) Field of Classification Search ........... 370/310; 455/412.1, 412.2, 466
See application file for complete search history.

(56) References Cited

U.S. PATENT DOCUMENTS

| | | | |
|---|---|---|---|
| 5,408,519 | A | 4/1995 | Pierce et al. |
| 5,613,213 | A | 3/1997 | Naddell et al. |
| 5,978,775 | A | 11/1999 | Chen |
| 5,978,833 | A | 11/1999 | Pashley et al. |

(Continued)

FOREIGN PATENT DOCUMENTS

DE   19941461 A1   3/2001

(Continued)

OTHER PUBLICATIONS

European Search Report dated Jul. 18, 2008 issued by the European Patent Office in related EPO Application No. EP 08 15 3656.

(Continued)

*Primary Examiner* — Charles Shedrick
(74) *Attorney, Agent, or Firm* — Novak Druce + Quigg LLP

(57) ABSTRACT

Embodiments of the disclosure are concerned with modification of messages en route to a destination. One such modification is the addition of third party material, such as advertisement data, to a message. A service located in the network receives the sender's message and decodes the indicated modification in order to decide how to modify the message. The message can include transmission data identifying one or more destinations and a message body identifying content thereof which is specified by a sending party. The service can select data on the basis of at least one parameter that is not directly related to the location of the sending party and the selected data are not directly related to the content of the message. The service can modify the message with the selected data. Thus, the decision as to the nature of the modification is unrelated to messages that are composed by the user.

34 Claims, 15 Drawing Sheets

U.S. PATENT DOCUMENTS

| | | | |
|---|---|---|---|
| 6,023,700 A | 2/2000 | Owens et al. ............... 707/10 |
| 6,097,942 A | 8/2000 | Laiho |
| 6,205,432 B1 | 3/2001 | Gabbard et al. |
| 6,334,145 B1 | 12/2001 | Adams et al. |
| 6,345,279 B1 | 2/2002 | Li et al. |
| 6,381,465 B1* | 4/2002 | Chern et al. ............... 455/466 |
| 6,405,243 B1 | 6/2002 | Nielsen |
| 6,684,249 B1 | 1/2004 | Frerichs et al. |
| 6,920,326 B2 | 7/2005 | Agarwal et al. |
| 7,072,947 B1 | 7/2006 | Knox et al. |
| 7,149,537 B1 | 12/2006 | Kupsh et al. |
| 7,558,559 B2 | 7/2009 | Alston |
| 2001/0047272 A1 | 11/2001 | Frietas et al. |
| 2002/0077130 A1 | 6/2002 | Owensby ............... 455/466 |
| 2002/0083411 A1 | 6/2002 | Bouthors et al. |
| 2002/0137507 A1 | 9/2002 | Winkler ............... 455/412.1 |
| 2002/0138291 A1 | 9/2002 | Vaidyanathan et al. |
| 2003/0003929 A1* | 1/2003 | Himmel et al. ............... 455/466 |
| 2003/0003935 A1* | 1/2003 | Vesikivi et al. ............... 455/517 |
| 2003/0040297 A1 | 2/2003 | Pecen et al. |
| 2003/0040300 A1 | 2/2003 | Bodic et al. ............... 455/412.1 |
| 2003/0154300 A1 | 8/2003 | Mostafa |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0043777 A1 | 3/2004 | Brouwer et al. |
| 2004/0054576 A1 | 3/2004 | Kanerva et al. |
| 2004/0136358 A1 | 7/2004 | Hind et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0259526 A1 | 12/2004 | Goris et al. |
| 2005/0010641 A1 | 1/2005 | Staack |
| 2005/0125397 A1 | 6/2005 | Gross et al. |
| 2005/0249216 A1 | 11/2005 | Jones |
| 2005/0289113 A1 | 12/2005 | Bookstaff |
| 2006/0031327 A1 | 2/2006 | Kredo |
| 2006/0095511 A1 | 5/2006 | Munarriz et al. |
| 2006/0123014 A1 | 6/2006 | Ng |
| 2006/0129455 A1 | 6/2006 | Shah |
| 2006/0141923 A1 | 6/2006 | Goss |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0204601 A1 | 9/2006 | Palu et al. |
| 2006/0206586 A1 | 9/2006 | Ling et al. |
| 2006/0276170 A1 | 12/2006 | Radhakrishnan et al. |
| 2006/0276213 A1 | 12/2006 | Gottschalk et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0047523 A1 | 3/2007 | Jiang |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0100805 A1 | 5/2007 | Ramer et al. |
| 2007/0105536 A1 | 5/2007 | Tingo, Jr. |
| 2007/0117571 A1 | 5/2007 | Musial |
| 2007/0149208 A1 | 6/2007 | Syrbe et al. |
| 2007/0290787 A1 | 12/2007 | Fiatal et al. |
| 2008/0004046 A1 | 1/2008 | Mumick et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0070579 A1 | 3/2008 | Kankar et al. |
| 2008/0071875 A1 | 3/2008 | Koff et al. |
| 2008/0082686 A1 | 4/2008 | Schmidt et al. |
| 2008/0243619 A1 | 10/2008 | Sharman et al. |
| 2009/0275315 A1 | 11/2009 | Alston |

FOREIGN PATENT DOCUMENTS

| | | |
|---|---|---|
| DE | 10061984 A1 | 6/2002 |
| EP | 1 073 293 A1 | 1/2001 |
| EP | 1 109 371 A2 | 6/2001 |
| EP | 1 220 132 A2 | 7/2002 |
| EP | 1 239 392 A2 | 9/2002 |
| EP | 1 365 604 A2 | 11/2003 |
| EP | 1 408 705 A1 | 4/2004 |
| EP | 1 455 511 A1 | 9/2004 |
| EP | 1 542 482 A2 | 6/2005 |
| EP | 1 587 332 A1 | 10/2005 |
| EP | 1 615 455 A1 | 1/2006 |
| EP | 1 633 100 A1 | 3/2006 |
| EP | 1 677 475 A1 | 7/2006 |
| GB | 2 369 218 A | 5/2002 |
| GB | 2 406 996 A | 4/2005 |
| GB | 2 414 621 A2 | 11/2005 |
| JP | 2002/140272 | 5/2002 |
| JP | 2002140272 | 5/2002 |
| JP | 2007-087138 A | 4/2007 |
| JP | 2007-199821 A | 8/2007 |
| WO | WO 96/24213 A1 | 8/1996 |
| WO | WO 00/44151 | 7/2000 |
| WO | WO 00/44151 A2 | 7/2000 |
| WO | WO 01/22748 A1 | 3/2001 |
| WO | WO 01/31497 A1 | 5/2001 |
| WO | WO 01/50703 A2 | 7/2001 |
| WO | WO 01/52161 A2 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/054803 A1 | 7/2002 |
| WO | WO 02/069585 A2 | 9/2002 |
| WO | WO 02/069651 A2 | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/049461 A2 | 6/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100470 A1 | 11/2004 |
| WO | WO 2004/100521 A1 | 11/2004 |
| WO | WO 2004/102993 A1 | 11/2004 |
| WO | WO 2004/104867 A2 | 12/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/005001 A2 | 1/2006 |
| WO | WO 2006/016189 A1 | 2/2006 |
| WO | WO 2006/027407 A1 | 3/2006 |
| WO | WO 2006/040749 A1 | 4/2006 |
| WO | WO 2006/093284 A1 | 9/2006 |
| WO | WO 2006/119481 A2 | 11/2006 |
| WO | WO 2008/013437 A1 | 1/2008 |
| WO | WO 2008/045867 A1 | 4/2008 |
| WO | WO 2008/147919 A1 | 12/2008 |

OTHER PUBLICATIONS

European Search Report dated Jul. 18, 2008 issued by the European Patent Office in related EPO Application No. EP 08 15 3658.

English translation of First Office Action issued by the Chinese Patent Office in related Chinese Application No. 200480019404.X received Aug. 19, 2008 by Applicant.

U.K. Patent Office Examination Report Under Section 18(3) dated Mar. 29, 2006 issued in connection with U.K. Application No. GB 0315984.5.

European Search Report dated Jul. 22, 2008 issued by the European Patent Office in related EPO Application No. EP 08153651.8.

European Search Report dated Jul. 23, 2008 issued by the European Patent Office in related EPO Application No. EP 08153654.2.
Extended European Search Report dated Dec. 29, 2008 issued by the European Patent Office in counterpart EPO Application No. EP 07120480.4.
Office Action dated Apr. 9, 2009 issued in related U.S. Appl. No. 12/005,452 (20 pages).
Text of Second Office Action (English translation) issued Jun. 12, 2009 in corresponding Chinese Patent Application No. 200480019404.X. (2 pages).
Office Action dated Dec. 30, 2009 issued by USPTO in related U.S. Appl. No. 12/477,766 (13 pages).
Office Action issued from the U.S. Patent and Trademark Office dated Jan. 27, 2010 issued in related U.S. Appl. No. 12/477,766 (25 pages).
Office Action dated Mar. 9, 2011 issued in related U.S. Appl. No. 12/477,766 (27 pages).
Office Action dated Sep. 7, 2010 issued in related U.S. Appl. No. 12/477,766 (26 pages).
Extended European Search Report dated Dec. 2, 2008 issued by the European Patent Office in counterpart EPO Application No. EP 07120620.5.

* cited by examiner

MESSAGING SYSTEM AND SERVICE

FIELD OF THE INVENTION

This invention relates to messaging systems, in particular but not exclusively to messaging carried out using wireless terminals, which operate in communications networks.

BACKGROUND OF THE INVENTION

Currently the Short Message Service (SMS) is the medium of choice for personal messaging, and several companies have designed systems that are intended to include advertisement information in SMS messages. For example, International patent application WO 03/015430 describes a service whereby advertisement data (including length of advertisement (number of characters), a preview of the advertisement and an identifier associated with the advertisement provided by external sources) are stored on mobile terminal in a "local" store, and the user selects an advert, from the store, to accompany an outgoing message. The terminal then calculates a length available for text, and the sender is allowed to enter a message having a length up to the calculated length. An outgoing message is then created, comprising the advertisement ID associated with the selected advertisement and the user's message text, and having a header indicating that the message has advertising content. The outgoing message is then sent from the terminal and received by the SMSC, which checks the header of the message; any message having an identifier corresponding to the advertisement type is passed to an "ad server". The ad server processes the message, effectively selecting an advertisement from a store, creating one or more messages that comprise the selected advertisement and creating an SMS message that can be read by the recipient's mobile phone terminal.

Since advertisements are selected by the sender from those stored locally on terminal, the terminal needs to be equipped with appropriate software, and the currently selectable advertisement IDs need to be distributed to all subscribing terminals. In addition, the SMSC has to be equipped with some means of identifying these advertisement-type messages from other types of messages in order to route them to the ad server. Furthermore, since each SMS message is limited to 160 characters, the ad server quite often creates a plurality of messages, which means that either the receiving terminal has to be equipped with some software that concatenates the messages together in some elegant manner (since presentation is very important with advertising), or the receiving terminal simply displays the messages separately, as is the case with non-modified SMS messages exceeding 160 characters in length. Neither of these is ideal from the point of view of convenience or presentation.

The new messaging service, known as Multimedia Messaging Service (MMS), offers messages of unlimited size and content type that are compiled as HTTP messages, which means that they offer a transaction capability with possible super-distribution of content along with accuracy, tracking and feedback of messages. However, despite the fact that many mobile telephones have imaging and Multimedia Messaging Service (MMS) capabilities, and despite the fact that the Multimedia Message Service would appear to be a natural choice of messaging format for including advertising content, there is no guarantee that MMS will become as ubiquitous as SMS. This is due to several reasons, namely that there is a perceived high cost of Multimedia messaging; that SMS fulfils basic personal messaging needs; and that rich media messaging requires more imagination and preparation by the user.

An object of the present invention is to provide a convenient method of modifying messages, which, from the point of view of the end user, is simple to use.

SUMMARY OF THE INVENTION

According to a first aspect of the present invention there is provided a method of modifying a message sent through a data communications network, the message including transmission data identifying one or more destinations of said message and a message body identifying content thereof which is specified by a sending party, the method including:

selecting data, in response to receiving a said message, on the basis of at least one parameter that is not directly related to the location of the sending party, wherein the said selected data are not directly related to the content of the message;

modifying said message so as to include the selected data therein; and transmitting the modified message to said one or more destinations in accordance with the transmission data.

Embodiments of the invention thus provide a means of intercepting messages sent from A to B, modifying the message in a way that is unrelated to the content of the message, and transmitting the message onto its destination (B). Since the message is not modified by the terminal associated with the sending party, a party can take part in a message modification service according to the invention using a completely standard terminal.

In one arrangement, the message sent through the data communications network is an MMS message, and the modifying step includes adding selected data to the MMS message, and transmitting it as an MMS message; and in another arrangement the message originates from the sender as an SMS message, and the modifying step includes changing the SMS message into an MMS message, which includes both the content of the original SMS message and the data selected according to the method. In yet further arrangements, the message sent through the data communications network is an email message, and the modifying step includes adding the selected data to the email message and transmitting it as an email message; alternatively the message can be transmitted as GPRS data packets and the recipient is notified of the presence of a suitably modified message by means of an SMS message, whereupon the recipient can request delivery of the modified message in the form of GPRS data.

In order to participate in a service embodying this method, parties are required to subscribe to the service; subscription can be performed by entering data into a WAP page that is downloaded to the user's terminal or by entering data by means of a data gathering application running on the terminal. The subscribing step involves registering personal characteristics and statistics, and explicitly consenting to modification of their messages.

The parameter used in the selecting step can be related to one or more of these personal characteristics, such as age, occupation, preferences, context (work, play) etc.; or related to environmental factors such as time of day, day of the week etc. Alternatively the parameter can be selected at random. Preferably the method includes keeping a track of data that have been selected, so as to ensure that the same data are not sent to the same person twice. The parameter may be a value indicating a number of modified messages that a recipient is willing to receive, in which case the method includes checking how many messages the recipient has already received and only modifying the message in the event that the specified number has not been exceeded.

The selectable data are preferably stored in a data store, such as a database, and, in order to enable personalized selection thereof, the selectable data are associated with data describing preferences, time of day, location, occupation, context etc. that characterize the selectable data and that correspond to the parameters. This therefore provides a means of selecting data that are suited to the sender and/or recipient.

The selecting step can include selecting data on the basis of a further parameter which may be related to the location of the sending and/or receiving party. Thus, for example, if the location of the sending party is identified to be in the vicinity of a football ground, the selection of data can include selecting data relating to football. Alternatively or additionally the further parameter can relate to the content of the message specified by the sending party. For example, the parameter could be words within the message; in some instances certain words can be linked with certain selectable data—for example, if the message includes the phrase "You should see my new shoes!", and the word "shoes" is linked to images indicative of a shoe retailer—then the selection of data can include data corresponding to one of these images.

Preferably the selectable data are categorised in some manner into a plurality of categories, and the sending and/or receiving party can specify a specific category of interest. Conveniently the categories can be previewed and selected either via the Web or via WAP-pages. This category selection provides a further means of personalizing the data that are selected for inclusion in the message. In one arrangement the categories are advertisement campaigns, which have a limited life span. When a campaign ends the subscribers who have selected that campaign (i.e. that category) can automatically be offered a new campaign of the same genre, e.g. via a MMS message containing new campaign details, terms and conditions.

Thus with embodiments of the present invention outgoing messages can be decorated with branded rich media content. This content can be tag-formatted advertising but could also be user generated or received from any $3^{rd}$ party, being appended to messages to as to provide sponsored terminal-to-terminal store-and-forward messaging.

The selected data can include one or more separate entities, for example, one entity can be an animation and another, an auto-play audio clip. The entities can be combined in a single message.

Since, in the first instance, the criterion used to select data to be used in message modification does not rely on input from the sending party when the message is composed, the mobile terminals do not require any additional software over and above the standard operating system software.

For the message sent through the data communications network to be routed to a service performing the method described above, the user does not need to explicitly enter details of the service (in terms of a network destination ID) on his terminal. Instead configuration messages can automatically be sent to the terminal when the user subscribes to the service. This feature of automatic modification of terminal settings forms a second aspect of the present invention.

In accordance with this second aspect of the invention there is provided a method of configuring a data message for transmission through a data communications network, wherein the data communications network comprises at least one store-and-forward network node arranged to store said data messages and forward the same to the or each recipient in dependence on status data corresponding to a terminal associated therewith, the method comprising:

receiving a configuration message identifying a store-and-forward network node;

selecting store-and-forward configuration settings from said configuration message;

creating a said data message, said data message comprising transmission data identifying one or more destinations of said message and a message body identifying content thereof; and transmitting said created data message in accordance with said selected store-and-forward configuration settings, wherein said configuration message identifies a store-and-forward network node to which a said data message is to be sent for modification of the content thereof during transmission of said message.

This configuration message can be sent to a subscribing mobile terminal via Over-The-Air (OTA) settings. The configuration message identifies a store-and-forward network node, which, when the terminal is sending MMS messages, corresponds to an MMSC other than the default network operator's MMSC, and is essentially a proxy MMSC. Subsequently created messages are thereafter sent to the identified store-and-forward network node, which is arranged to perform a method according to the first aspect of the invention. Having completed the method, the identified store-and-forward network node transmits the modified message to the conventional store-and-forward server (MMSC), which is typically owned by the network operator.

Since the method is performed on a bespoke store-and-forward network node, a further advantage of embodiments of the invention is that it does not interfere with existing services, which means that subscribers can still receive MMS messages from the default (network operator's) MMSC.

The personal details entered by subscribers are conveniently stored in a database that is independent of network operator, which facilitates providing initial distribution statistics and tracking eventual super-distribution of multimedia content across various network operators.

In addition to providing a system for modifying personal messages emanating from individual subscribers, the invention can be applied to modify messages emanating from information providers and the like. Accordingly, in a third aspect of the present invention there is provided a method of modifying a message sent through a data communications network, the method comprising:

receiving, at a second network node, a message from a first network node, the message having a message body comprising first data, and transmission data identifying a destination of said message, wherein the first data have been created by an information service;

selecting second data, in response to receiving said message;

modifying said message so as to include the selected second data in the message body thereof; and transmitting the modified message to said destination in accordance with the transmission data.

Further features and advantages of the invention will become apparent from the following description of preferred embodiments of the invention, given by way of example only, which is made with reference to the accompanying drawings.

DETAILED DESCRIPTION OF DRAWINGS

Embodiments of the invention are concerned with modification of data messages en route for a recipient. Specifically, embodiments are concerned with performing a modification that is independent of the subject matter of the data messages, instead basing the modification on some parameter that is extrinsic to the content of the message. The nature of this modification, and the criteria used to make the modification, will be described in detail later in the description, but first a description of the infrastructure needed to support the modification will be presented.

Figure 1:
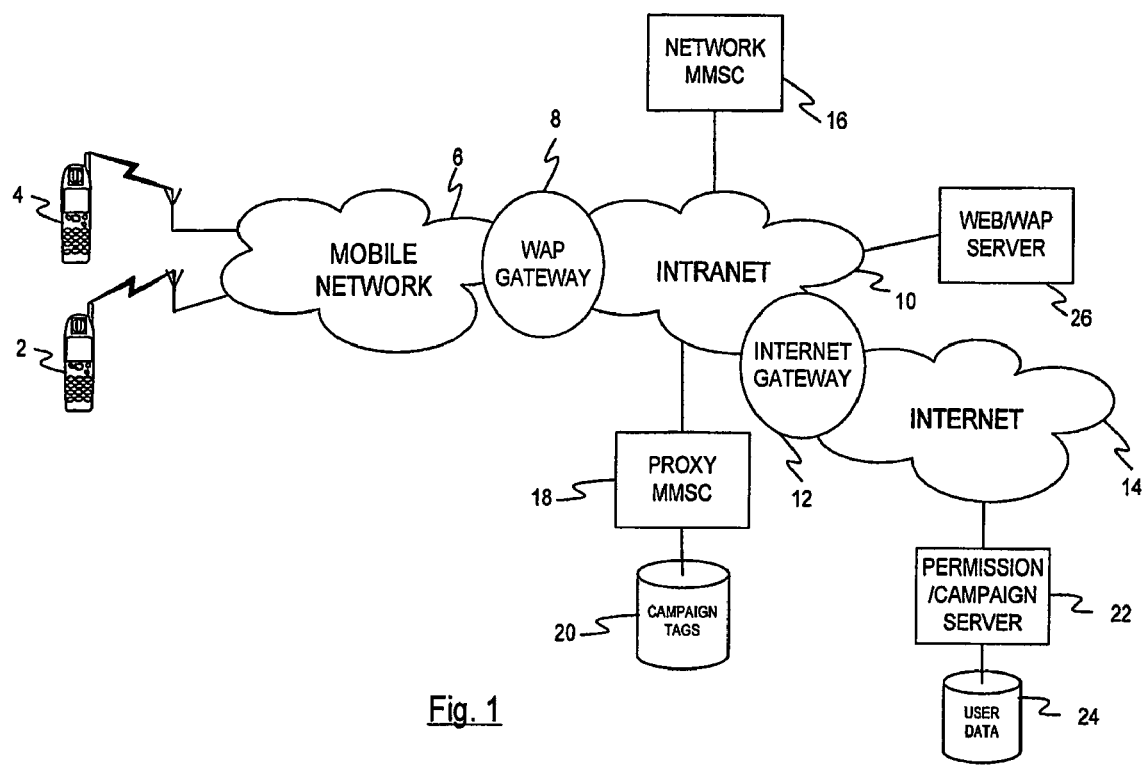
FIG. 1 is a schematic illustration of a mobile network arranged in accordance with an embodiment of the invention.
Figure 2:
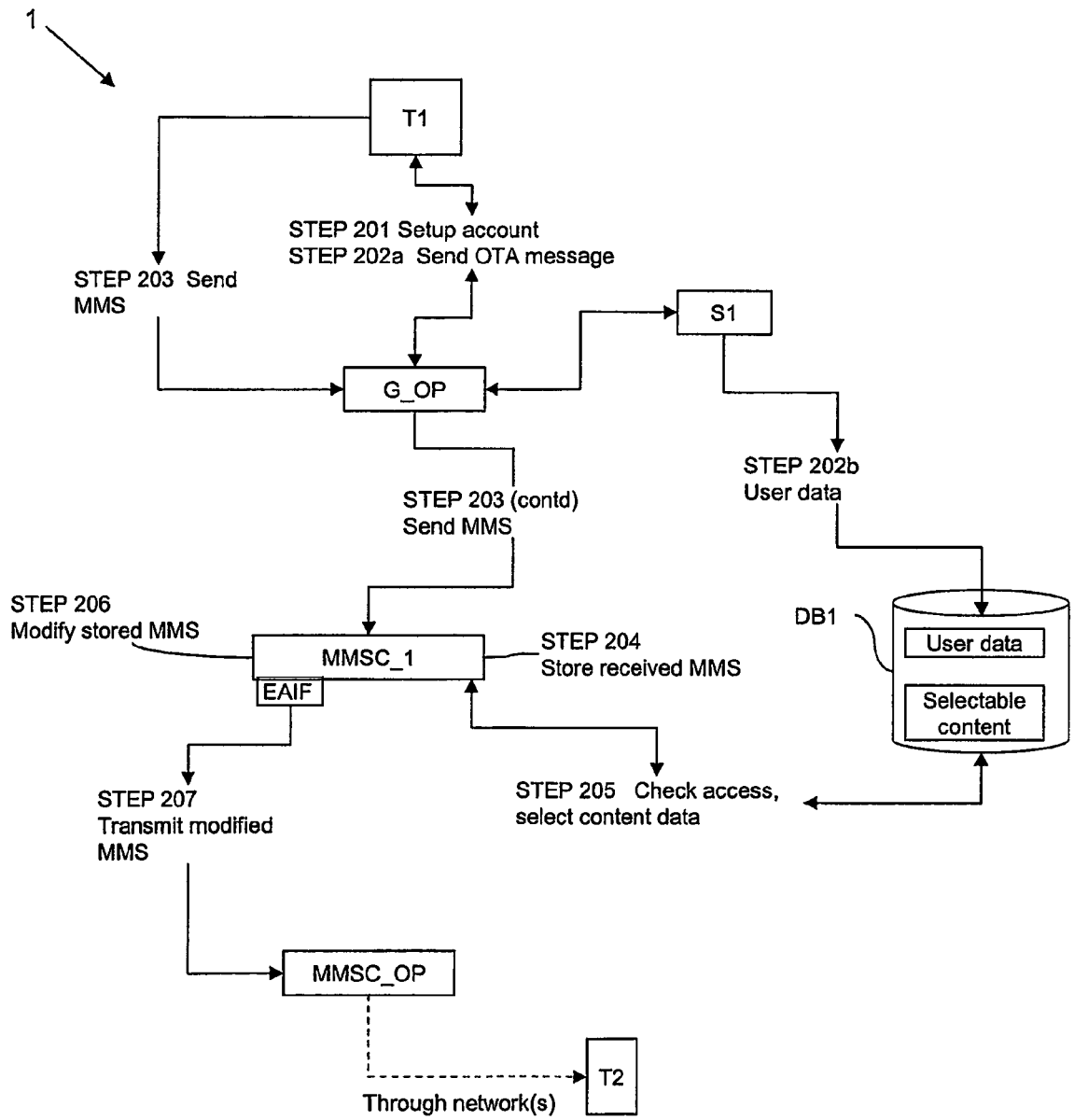
FIG. 2 is a schematic illustration of data exchanges between components of the system illustrated in FIG. 1.

FIGS. 1 and 2 show an example of a data messaging system 1 within which embodiments of a first aspect of the invention operate. In FIG. 2, the arrows indicate data flows within the data messaging system 1 and the blocks indicate components of the data messaging system 1. This embodiment, hereinafter referred to as a message modification service, is concerned with Multimedia messages (MMS messages), but the messages could be short messages (SMS), email messages, bespoke messages in the form of GPRS data and/or streamed data; the specific arrangement of the data messaging system 1 is dependent on the type of message being transmitted, and alternative configurations are described later.

In the arrangement shown in FIGS. 1 and 2, a terminal T1 communicates with various network devices within the data messaging system 1. The terminal T1 may be a wireless terminal such as a mobile phone, a PDA or a Laptop computer. The data messaging system 1 comprises a WAP gateway G_OP, which is typically a network operator's WAP gateway; a Web and WAP services server S1, with which the terminal T1 communicates; first and second store-and-forward message servers MMSC_1, MMSC_OP, the second being a network operator's store-and-forward message server configured to store and forward messages in accordance with conventional methods; and a database DB1, arranged to store data in respect of subscribers, terminals such as T1 and content data.

In one arrangement the first message server MMSC_1, together with the Web and WAP services server S1, is arranged to operate inside the network operator's network, whilst the database DB1 is located within a proprietary network, which means that it is independent of any specific network operator and can be shared across a plurality of network operators. The database DB1 can either be provided by two separate databases 20, 24, as shown in FIG. 1, or by a single database, as shown in FIG. 2.

Figure 3:
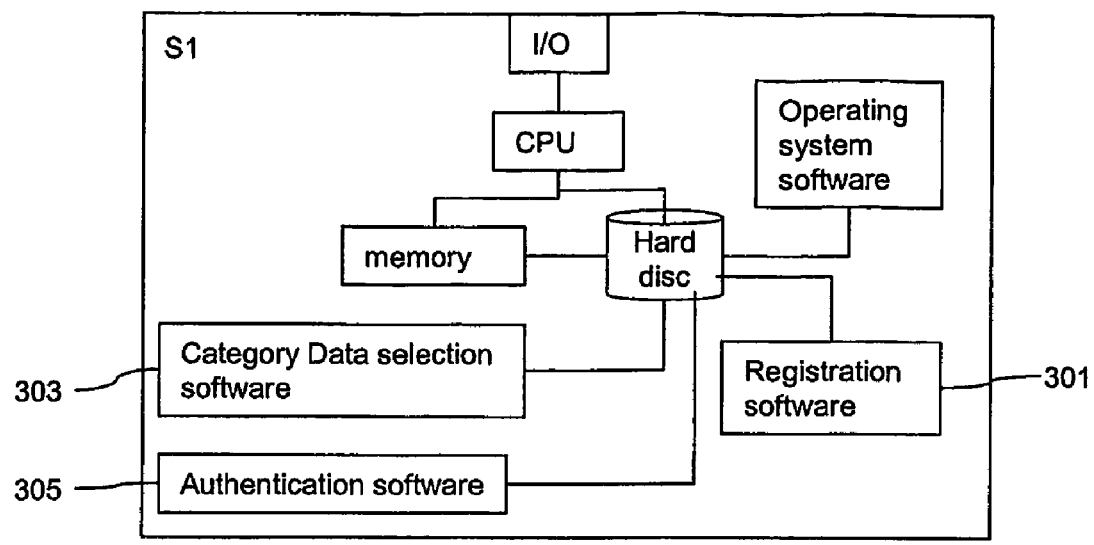
FIG. 3 is a block diagram showing components of the Web and WAP services server shown in FIGS. 1 and 2.

Referring to FIG. 2, the Web and WAP services server S1 can be accessed by a user of the terminal T1 actuating a URL corresponding to the server S1. Referring to FIG. 3, in addition to standard CPU, memory, data bus, Input/Output ports, data storage, and operating system programs, the server S1 comprises registration software 301, which processes requests to subscribe to the message modification service, while additionally receiving identification and preference data in relation to the subscriber; category selection software 303, which processes incoming category selection requests; and authentication software 305, which authenticates incoming requests for access to the category selection software. The data selection, identification and preference data are subsequently stored in the database DB1 for subsequent access by the first message server MMSC_1. The server S1 can either be provided by two separate servers 22, 26 (with the registration software 301 on server 26 and the authentication and category selection software 303, 305 on server 22) as shown in FIG. 1, or by a single server, as shown in FIG. 2.

Figure 4:
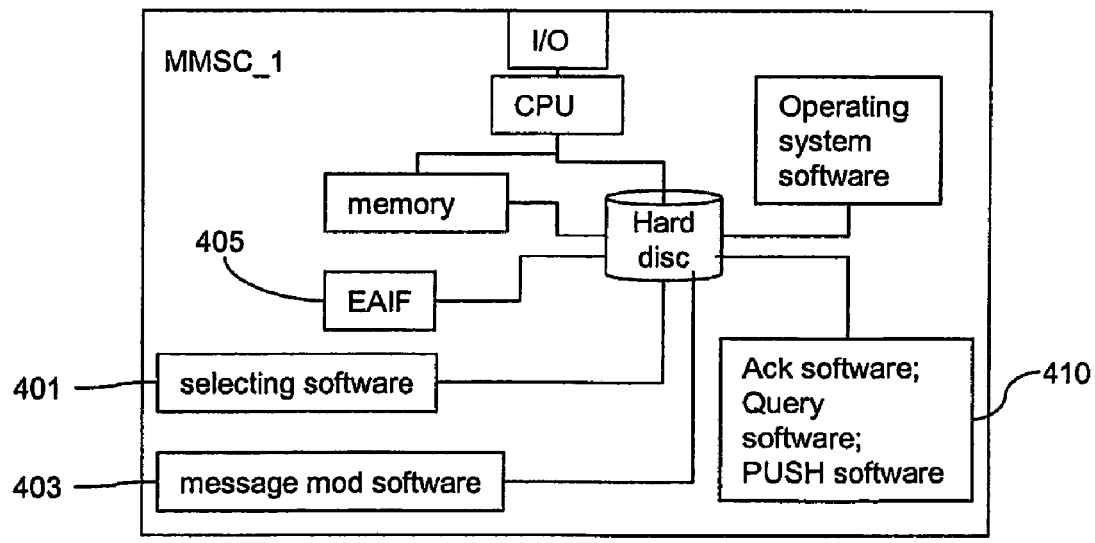
FIG. 4 is a schematic block diagram showing components of the proxy message server MMSC shown in FIGS. 1 and 2.

The first message server MMSC_1 can be considered a "proxy" store-and-forward message server, which is located between the network operator's WAP gateway G_OP and the network operator's message server MMSC_OP. Referring to FIG. 4, the MMSC_1 comprises standard processing components, and includes conventional software or hardware means for: notifying, in response to receipt of an MMS, the sending party that it has accepted the MMS; interrogating subscriber databases to determine whether the intended recipient has an MMS-compatible phone; informing the intended recipient that an MMS is available; and, in response to a request from the recipient, sending the message thereto (shown in combination in box labeled 410). In addition to these standard components, the MMSC_1 includes selecting software 401 for selecting data to add to an incoming message (described in more detail below), message modifying software 403 for modifying the incoming message so as to include the selected data (described in more detail below); and an external application interface (EAIF) 405 that is configured to enable the message server MMSC_1 to communicate with the operator's message server MMSC_OP, specifically to forward the modified messages to the operator's MMSC_OP in accordance with standard methods.

The selecting software 401 is arranged to identify sender and/or recipient information from an incoming message and select, by accessing the database DB1, the sender and/or recipients' permission and preference settings in order to determine how to modify the incoming message. The modifying software 403 is arranged to modify the incoming message in accordance with input from the selecting software

401, sending the modified message to the recipient in one of a plurality of formats (e.g. SMS or MMS). Preferably the proxy (or first) message server MMSC_1 communicates with the database DB1 via a Internet virtual private network (VPN) connection, and is arranged to cache, e.g. in an SQL database, permission and preference information so that it can operate the service even in case of VPN outages.

The registration software 301, category selection software 303, authentication software 305, selecting software 401 and modifying software 403 are preferably written in the Java programming language. The server S1 could, for example, be an Apache HTTP server, and the proxy message server MMSC_1 could be a J2EE JMS Server (see http://openjms-.sourceforge.net/). The registration software 301, category selection software 303 and authentication software 305 could be Java™ servlet containers configured to run within a Java platform such as Java 2 Platform Standard Edition v1.4.1 (for further information see resources available from Sun Microsystems™ e.g. at http://java.sun.com/j2se/1.4.1/and http://java.sun.com/products/servlet/index.html). The skilled person will appreciate that the software could be written in any suitable language.

Referring back to FIG. 2, one way of setting up an account with, and making use of, the message modification service according to this embodiment will now be described. At step 201 the user enters the URL corresponding to the Web and WAP services server S1, which causes the registration software 301 to send a Web page from the server S1, via the WAP gateway G_OP, where it is modified, using conventional techniques, into a format suitable for display on the user's terminal T1, and sent to the terminal T1. The user then enters various registration details into the web page and the terminal T1 sends the details to the server S1, via the WAP gateway G_OP. Referring back to FIG. 2, as part of the registration process, the user enters personal information details, such as name, address, terminal details (including capabilities), sex, occupation, interests, etc. and these details are stored, at step 202b, in the database DB1. Also a part of the registration process, the registration software 301 sends the user a user ID and password for accessing the server S1.

Alternatively the terminal T1 could have, stored thereon, an application arranged to capture such demographic data (not shown in the Figures) and which encapsulates the captured data in SMS messages or as GPRS packets and then transmits the same to the server S1. A suitable application could be transmitted to the terminal T1 (e.g. via GPRS or Bluetooth) in response to a request received by the server S1 from the terminal T1 and would be of a format suitable for cooperating with the operating system in use on the terminal T1 (alternatively the application could be pre-loaded onto the terminal T1).

Having completed the registration process, the registration software 301 sends, at step 202a, data via an Over-The-Air (OTA) MMS settings message, to the terminal T1, with details of the proxy message server MMSC_1. In response to receiving this message, the operating system programs on the terminal T1 automatically configure the default MMSC settings including the network address (URL) of the proxy message server MMSC_1 in accordance with the settings in the message. This therefore means that any MMS messages subsequently sent from the terminal T1 will be sent to the proxy message server MMSC_1 in the first instance. For further information regarding use of OTA protocol for the delivery of data to a WAP client from a WAP server, the reader is referred to literature available from the WAP Forum Ltd., in particular "Wireless Application Protocol, PUSH OTA Protocol Specification", published 16$^{th}$ Aug. 1999, available from http://www.wapforum.org/what/technical/PROP-PushOTA-19990816.pdf.

In addition to storing and processing registration requests, the server S1 is arranged to display, on request, a plurality of selectable categories, from which the subscriber can select. The subscriber can attempt to access the server S1 at any time, causing the authentication software 305 to authenticate or otherwise the access request. Several authentication methods are possible, one being based on the user's mobile phone number or the terminal ID (this being identifiable from, e.g. the header of a message associated with the access request), and another being via a web page having data entry fields corresponding to user name and password. Once authenticated, the user can select a category from the plurality, causing the selected category to be stored in the database DB1, along with other data associated with this user. The categories represent subject areas of interest—e.g. types of music, football, types of drinks etc. These selected category data, along with the user data stored at step 202b, are then available for use by the selecting software 401 running on the proxy message server MMSC_1, as will be described in more detail below. Alternatively, and in the event that the terminal T1 has a suitable local application stored thereon, the category data could be sent from the terminal T1 to the server S1; in such an arrangement the category data from which selection is to be made could be made available to the terminal T1 by means of the server S1 sending category data to the terminal T1 via SMS messages or as GPRS packets.

The aspect of category selection is not essential to the invention, but is a preferred feature, since it enables the proxy message server MMSC_1 to select content that matches some aspect of the sender's interests. Further aspects of this category selection are described in more detail below.

Figure 5:
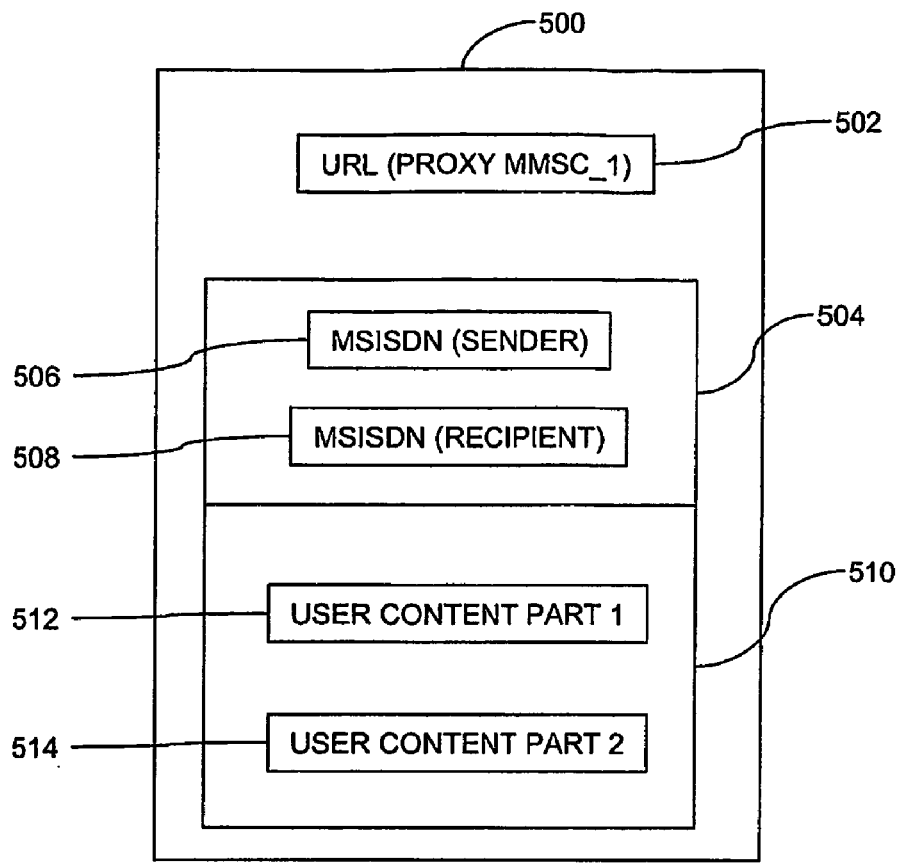
FIG. 5 is a schematic diagram illustrating an MMS message when transmitted from a sender terminal to the proxy message server MMSC shown in FIG. 2.
Figure 6:
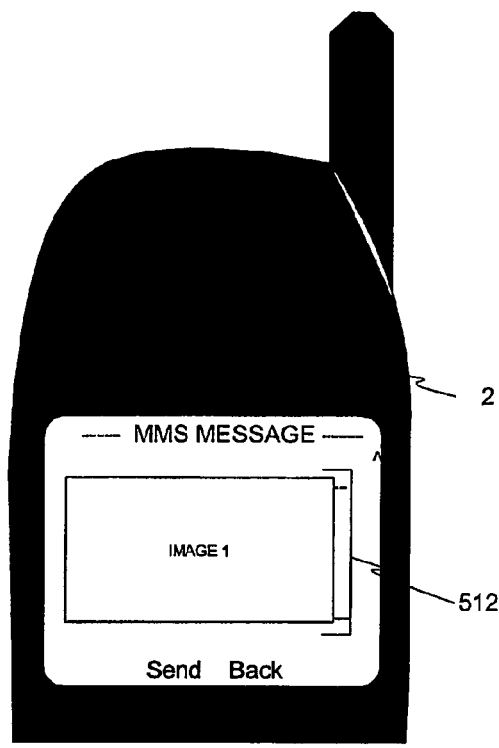
FIGS. 6 and 7 show user content parts of the MMS message of FIG. 5 when transmitted from a sender terminal.
Figure 7:
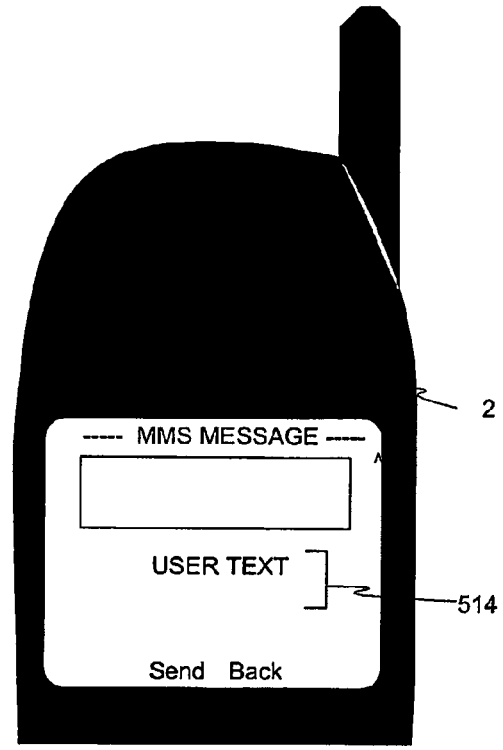

Having registered with the service and modified the store-and-forward multimedia message server settings on the terminal T1, any subsequently sent MMS messages by the terminal T1 will be directed to the proxy message server MMSC_1 and modified thereby, as will now be described with reference to FIGS. 5-7. At step 203, a MMS message is sent by the terminal T1; this message is encapsulated in an HTTP POST message including HTTP header 502 which identifies with the appropriate URL that the proxy message server MMSC_1 is the HTTP message recipient. The HTTP message body includes MMS header portion 504 and MMS body portion 510. The MMS body portion 510 includes one or more user content parts 512, 514, such as those illustrated in FIGS. 6 and 7.

Figure 8:
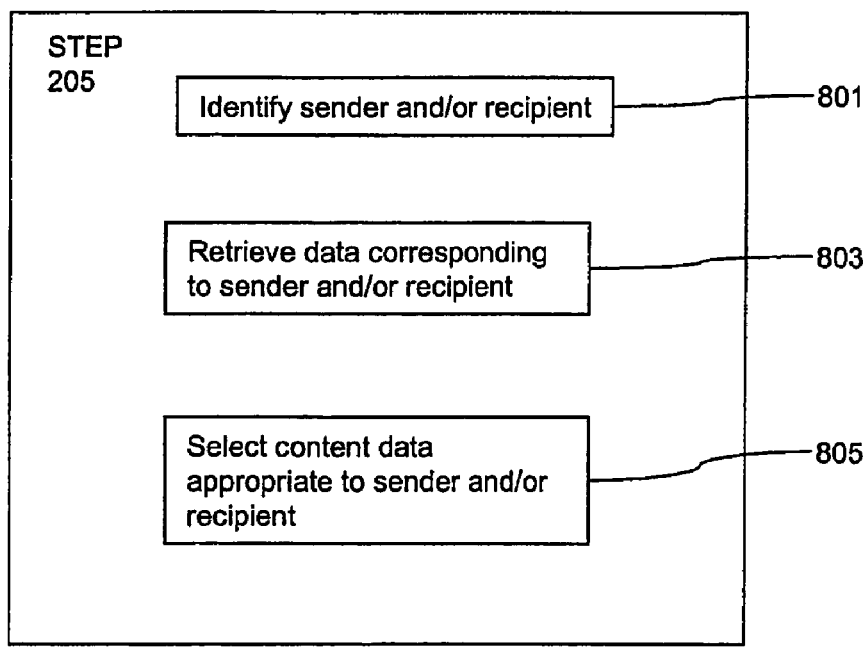
FIG. 8 is a flow diagram showing sub-steps of the data exchanges shown in FIG. 2.

At step 204, the US message 500 is received and stored by the proxy message server MMSC_1, in accordance with conventional techniques and at step 205, the selecting software 401 selects content data from the database DB1. Referring to FIG. 8, this step involves performing a plurality of sub-steps: firstly identifying (sub-step 801) the sender and recipient of the message (parts 506, 508); secondly retrieving (sub-step 803) user data from the database DB1 corresponding to the sender and/or recipient; and thirdly applying (sub-step 805) a filtering algorithm to the content data stored in the database DB1, using the user data retrieved at sub-step 803, in order to select content data appropriate to the received MMS. The nature of this filtering algorithm is described in more detail below.

Figure 9:
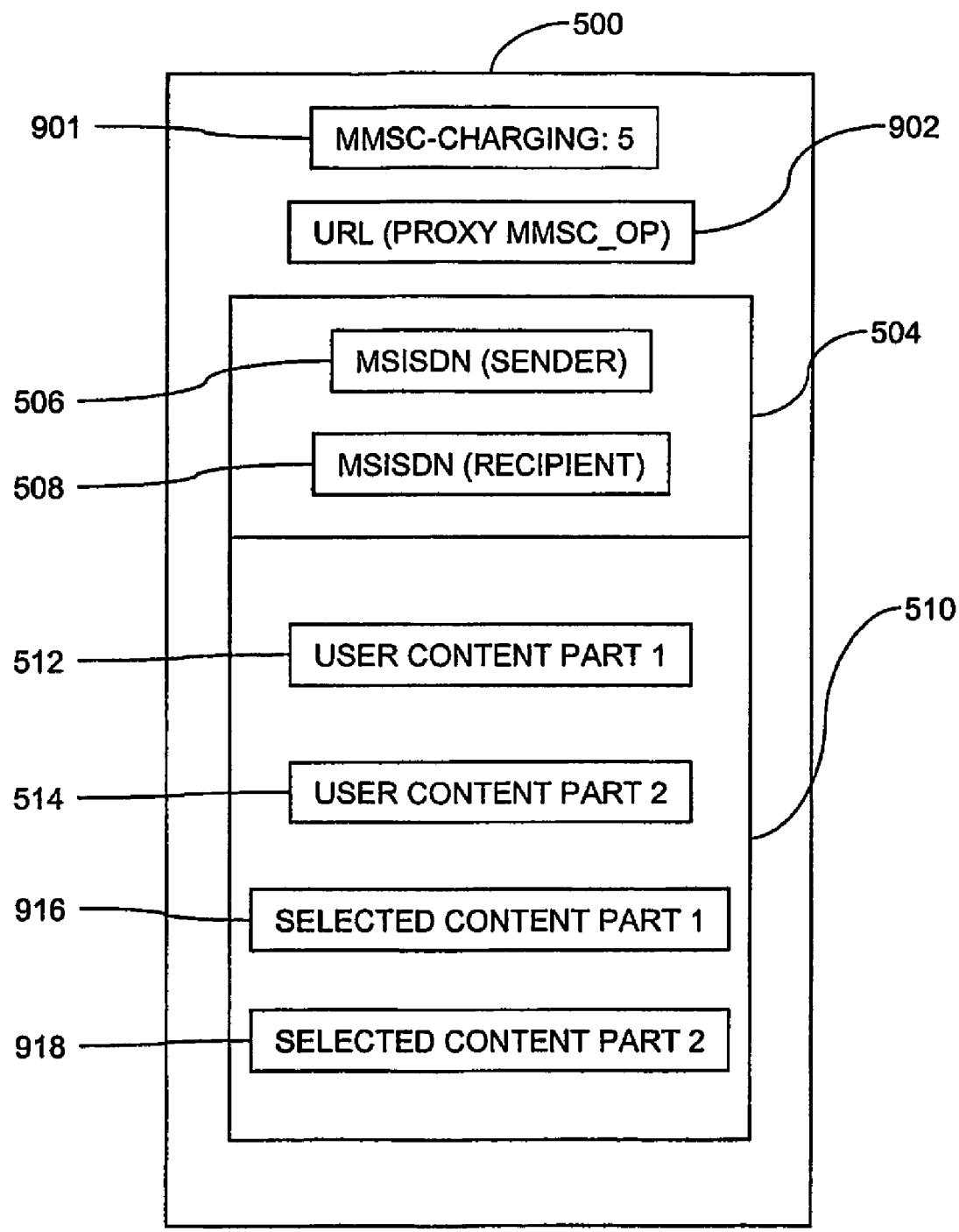
FIG. 9 shows content parts of an MMS message when modified according to an embodiment of the invention.

Once the content data have been selected, the message modification software 403 modifies, at step 206, the MMS that was stored at step 204. An MMS so-modified is shown in FIG. 9: the MMS is encapsulated in an HTTP POST message 900 including HTTP header 902 which identifies the network operator's message server MMSC_OP as the HTTP message recipient; the HTTP message body includes MMS header portion 504 and MMS body portion 510. The MMS message body portion 510 includes, in addition to one or more user content parts 512, 514, one or more content parts 916, 918. The HTTP message can also include an extension HTTP header 901, which includes charging information. At step 207 the modified MMS is transmitted to the network operator's message server MMSC_OP, and thereafter is delivered to the recipient (T2) in accordance with conventional methods.

As stated above, embodiments of the invention are concerned with modification of data messages en route for a recipient. The use of OTA messages to modify settings on a terminal, for use in re-directing messages whose content is to be modified without direct input from the sender is new. Thus the data messaging system 1, the proxy message server MMSC_1 and the functionality provided by the Web and WAP server S1 described above are new. Since the nature of this modification is not directly dependent on any input from the sender of the message, neither the sender nor recipient is required to modify their terminal. Furthermore, and as stated above, the idea of using OTA settings to direct messages to devices associated with the service means that the terminals do not need to be modified in this respect either. This therefore means that the service can be used independent of terminal type, which is a significant advantage.

The aspects of data selection—step 205 (and sub-steps 801, 803, 805)—will now be described in more detail.

As described above, once a user has subscribed to the message modification service, he can subsequently access the server S1 to specify a category of interest, which is then used by the proxy message server MMSC_1 in selection of data when modifying an incoming message. In one embodiment the data to be included in the messages (sub-step 805) is branded rich media content, in which case the categories from which the subscriber can select corresponds to a brand and the content is advertising content, referred to herein as a Tag element.

Figure 10A:
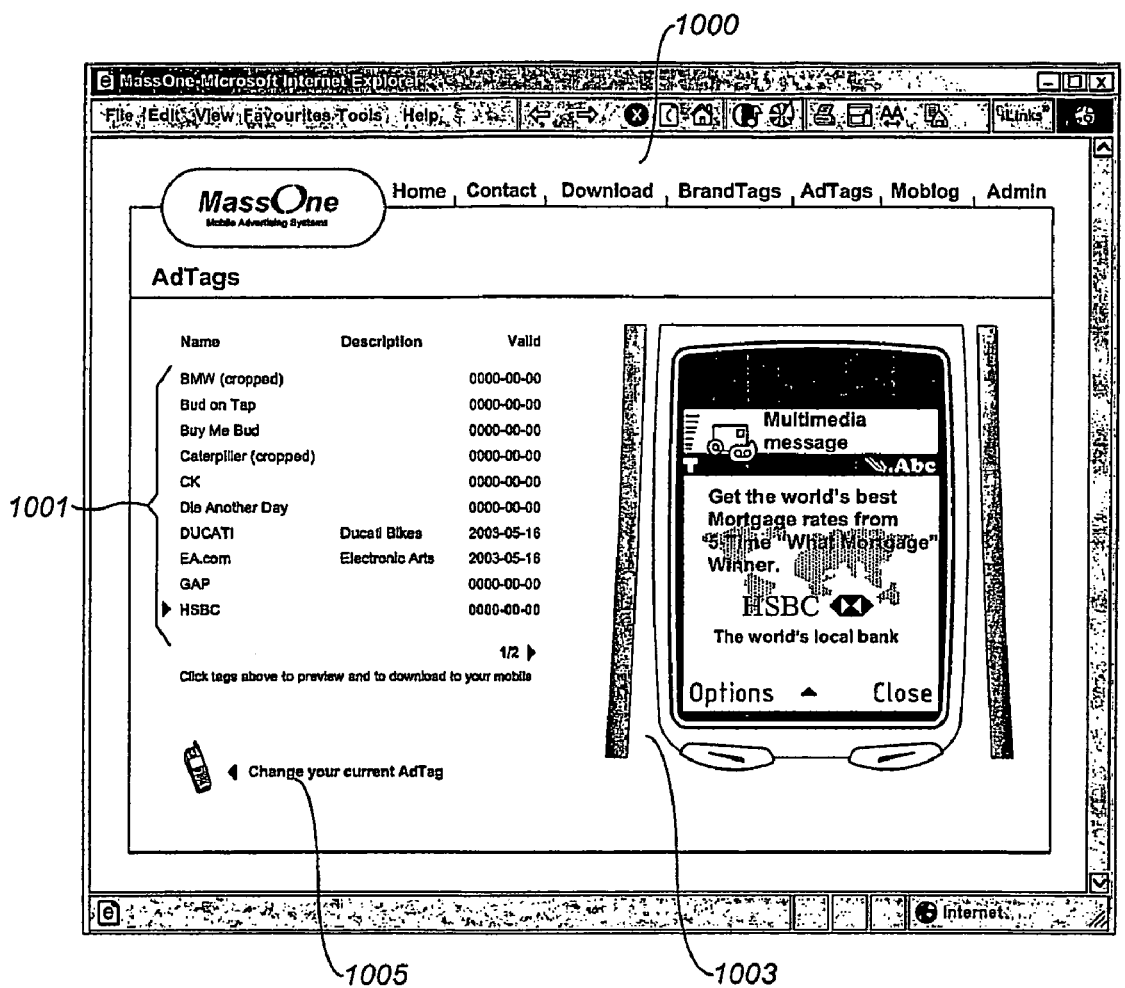
FIG. 10a shows a Web page allowing a subscriber to select a category of interest.
Figure 10B:
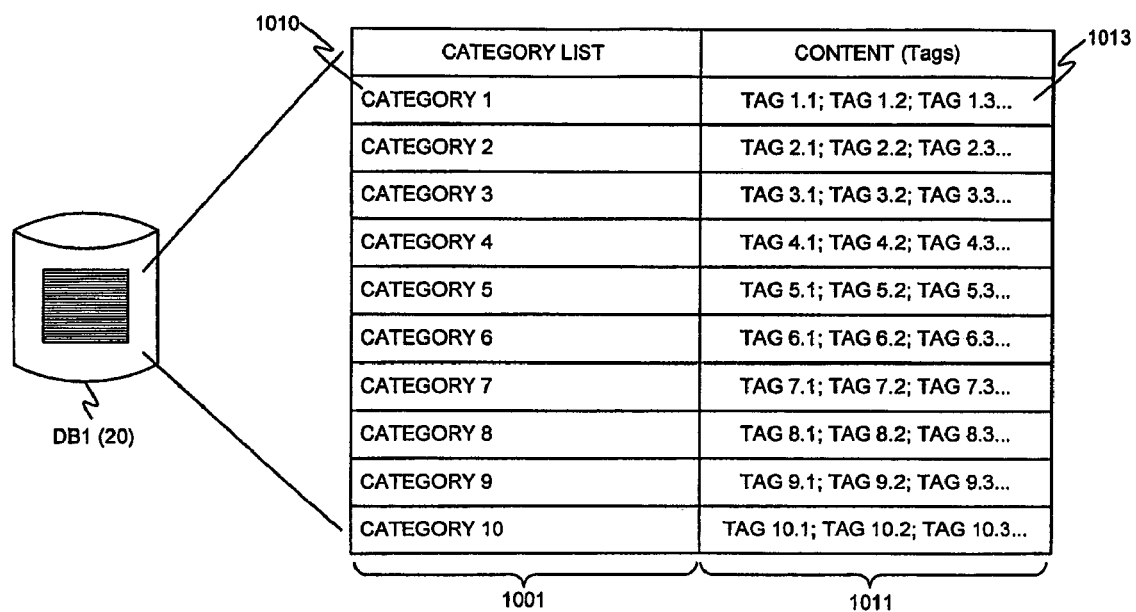
FIG. 10b is a schematic illustration of category information and data corresponding thereto, as stored in the database shown in FIGS. 1 and 2.

FIG. 10*a* shows a Web page 1000 allowing a participating message sender to select a category 1001, and an example of a tag 1003 within one of the categories; modification of a currently selected category can be made via item 1005 on the Web page 1000. FIG. 10*b* shows category information 1001 and content (Tags) 1011 corresponding thereto, and shows that each category 1010 has a plurality of Tags 1013 associated therewith. Once a category has been selected by the sender, and when an MMS message is subsequently sent by the corresponding sender (step 203) the selecting software 401 running on the proxy message server MMSC_1 selects (sub-step 805) one or more of the Tags in the selected category to be added to the message being sent.

There are several advantages associated with this category feature of the invention, a first of which is that it provides a means of ensuring that content that is selected by the selecting software 403 is relevant to the sender's and/or recipient's interests, thereby removing the need for the sender to include this information in the messages to be modified. A second advantage is associated with the fact that the categories are stored and maintained in a central location. In the event of a change of category (which is common in the field of advertising), the change only needs to be effected at a central location, rather than having to distribute data identifying the updated categories to each subscriber to the message modification service.

As described above, at sub-step 805, the selecting software 401 applies a filtering algorithm to select an appropriate Tag to add to the message. Functionally, the filtering algorithm ensures that different Tags, each in the same user-selected category, are added to subsequent messages transmitted using the system, and generally that various of the different Tags available in a category are added to different messages. More specifically the filtering algorithm employs one or more of several parameters to select, from all of the Tags available in a category, the Tag or Tags to be added to the current message. As stated above, the selection of Tag is not directly related to input from the sender of the message, meaning that these parameters are essentially unrelated to the content of the MMS message (the content being parts 512, 514 shown in FIG. 5).

Instead, these parameters include one or more of:
1. The sender identity (either sending terminal T1 or information service (see below)), as identified in the MMS message header 504 (part 506), and data associated with the sender identity, such as:
    a. data identifying a stage in the category the sender is, as determined by the number and/or type of Tags previously sent by the sender;
    b. data identifying sender characteristics, such as age, sex, etc.;
    c. current context of the sender (i.e. home or at work);
    d. whether the sender has explicitly opted out of a particular category
2. The recipient identity, as identified in the MMS message header 504 (art 508) and data associated with the recipient identity, such as:
    a. data identifying a stage in the category the recipient is, as determined by the number and/or type of campaign messages previously received by the recipient;
    b. data identifying recipient characteristics, such as age, sex, etc.;
    c. current context of the recipient (home or at work);
    d. whether the recipient has explicitly opted out of a particular category;
3. A combination of sender and recipient identities (as per 1. and 2. above);
4. The current time and/or date;
5. Scheduling data for Tags;
6. Data relating to events occurring at that date or time (so that the selecting software 401 is arranged to access various electronically available entertainment listings, such as TV, films etc.);
7. A random selection parameter, causing the selection to vary between messages.

In order to select Tags on the basis of on one or more of these parameters, each of the Tag is characterized in some manner, and indeed, such characteristics data are stored in DB1 together with data identifying the Tags themselves.

Selection can also be based on the content of the MMS message itself (parts 512, 514). For example, Tags may be linked to certain words, or phrases, that appear in the message 500—e.g. if the user content part 512 includes the word "beer" (so that the message could be, for example, "Hi Steve, meet me at the Crown for a beer or six!"), one of the Tags linked to the word "beer" could be selected by the selecting software 401 at sub-step 805. Additionally or alternatively selection can be based on the location of the sender and/or recipient. For example, if the sender is identified to be at a cricket match, then, assuming there to be a mapping between cricket and Tags, one of the Tags linked to a cricket location could be selected at sub-step 805.

If the selecting software 401 determines, at sub-step 801, there to be multiple recipients, the selecting software 401 may either select a different Tag for each recipient or may select one that best matches the characteristics of all of the recipients. The latter may be achieved by evaluating characteristics of Tags against characteristics of each recipient, quantifying the evaluation into a score for each Tag and selecting whichever Tag has the highest score. In the event that the recipients and sender have previously selected categories that are different with respect to one another, the selecting software 401 can either only select Tags within the category corresponding to the sender, or identify the category most common to all recipients and sender and select Tags within that identified category.

The categories displayed on the Web page 1000 for selection therefrom can be dependent on characteristics of the subscriber. For example, when subscribing to the message modification service (step 201) the registration software 301 may ask the subscriber for his home, or preferred, location. As described above, these data are stored in database DB1 as user data at step 202b, so that, when a subscriber subsequently logs in to select a category, the category selection software 303 can display only those categories that match the subscriber's location. Other parameters can be used when determining which categories to display.

Whilst in the above embodiment settings corresponding to the proxy message server MMSC_1 are sent via an OTA message, they could alternatively be embedded in the terminal's SIM card, so that the subscriber receives and changes SIM when he has subscribed to the service. As a further alternative, the user could be notified of the settings and manually change them.

As an alternative to the proxy message server MMSC_1 implementation, the present invention could be installed as a filtering application (not shown) on the operator's message server MMSC_OP. In the event that the processing load associated with the selecting and modification of messages becomes significant, the data messaging system 1 could also include a separate, secondary MMS message server (not shown), which is configured with the selecting software 401, message modification software 403 and the EAIF 405. In such an arrangement the filtering application running on the operator's message server MMSC_OP could be arranged to pass messages that are identified to have been received from a subscriber to the service to this secondary MMS message server. In either of these arrangements the step of sending an OTA message to re-set MMSC settings in the subscriber's terminal would not be necessary.

As stated above, the arrangement shown in FIGS. 1 and 2, and the foregoing description is specifically tailored to the sending of MMS messages. However, the idea of modifying a message without requiring direct input from the sender, instead basing the modification on some parameter that is extrinsic to the content of the message, can be applied to other message types, such as SMS, email and streamed data (e.g. multicast data). The arrangement of the data messaging system 1 can be expected to vary, depending on the type of message to be sent, and FIGS. 11-14, together with the following description, briefly outlines alternative arrangements of the data messaging system. In these figures, where the functionality is identical or equivalent to that described with reference to FIG. 2, identical reference numerals are used; if there is additional, or substantial differences in functionality, different reference numerals are used.

Figure 11:
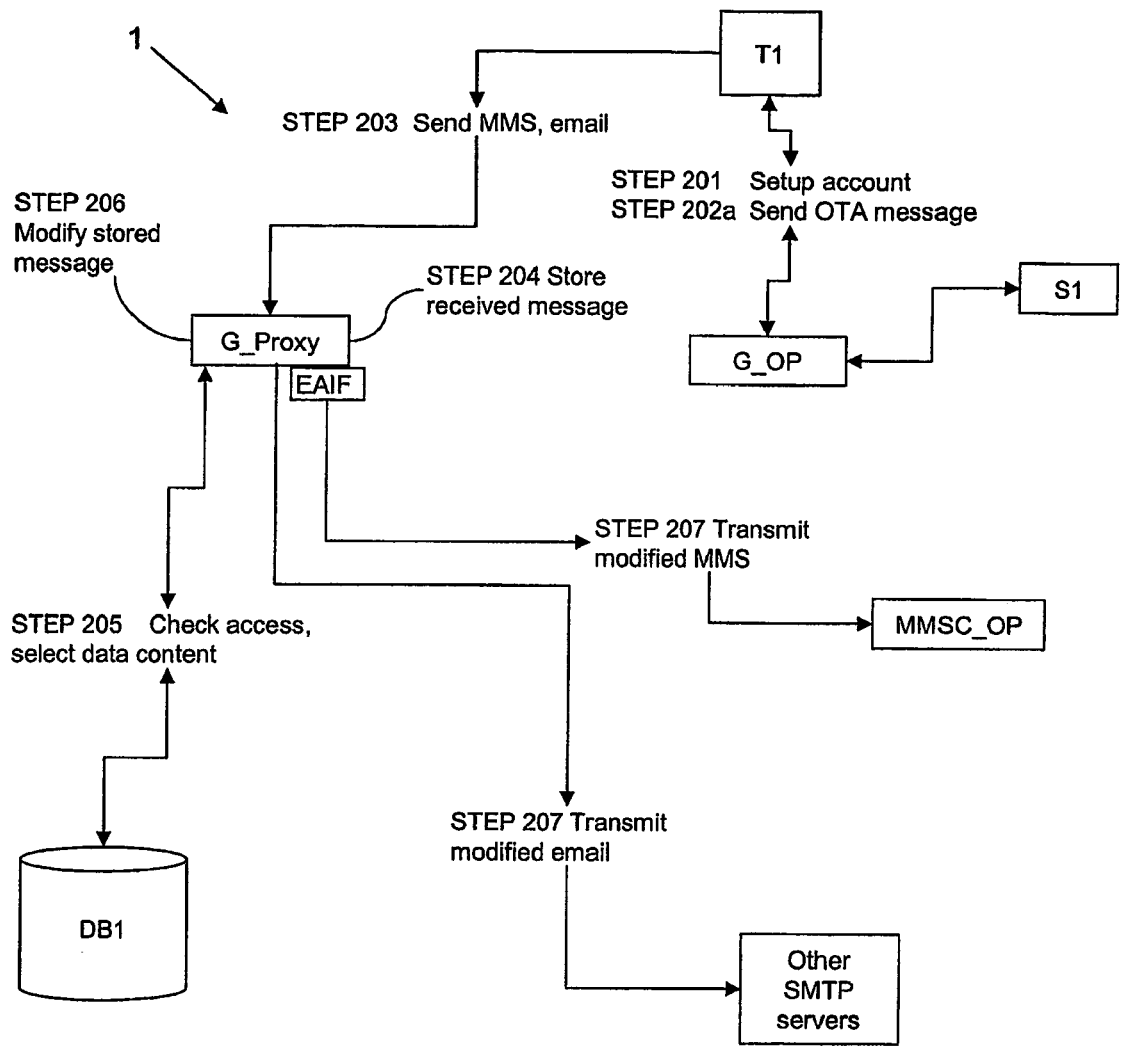
FIG. 11 is a schematic illustration of an alternative configuration of components of a mobile network according to a second embodiment of the present invention.

The data messaging system 1 shown in FIG. 11 is suitable for sending MMS messages or email messages. In this arrangement, the settings sent at step 202a correspond to a proxy WAP gateway G_Proxy, which has conventional WAP gateway functionality plus an SMTP server combined with the store-and-forward software 410, selecting software 401, message modification software 403 and the EAIF 405. The store-and-forward software 410 essentially includes components that are configured to store and transfer emails accordance with the SMTP protocol and components configured in accordance with MMS message handling (described above) (for information specifically related to SMTP issues, the reader is referred to Request For Comments (RFC) 2821, available from the IEEE at http://www.rfc-editor.org/).

Figure 12:
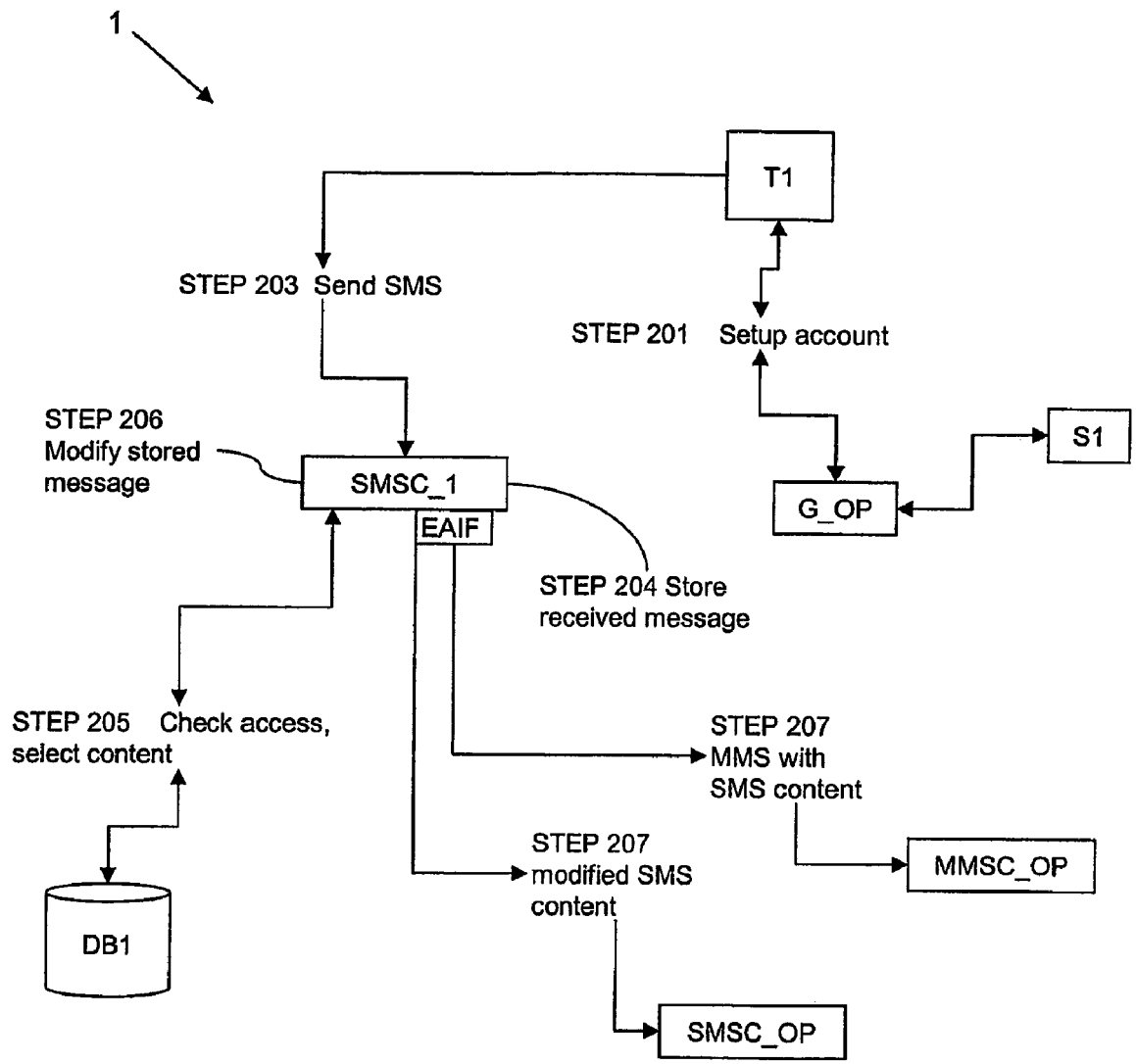
FIG. 12 is a schematic illustration of an alternative configuration of components of a mobile network according to a third embodiment of the present invention.

The data messaging system 1 shown in FIG. 12 is suitable for a subscriber sending SMS messages. In this arrangement the settings on the terminal T1 corresponding to the SMSC have been modified in some manner, so that outgoing SMS messages are directed to the proxy short message server SMSC_1. The message modification software 403 is arranged to either embed the content of the received message (arts 512, 514) into an MMS message (which then includes selected parts 916, 918), thereby effectively changing an incoming SMS message into an outgoing MMS message, or, if the terminal corresponding to the recipient is not MMS-enabled, to modify the received SMS message so that it includes selected parts 916, 918 (or ASCII character versions thereof), and forward the modified message as an SMS message.

Figure 13:
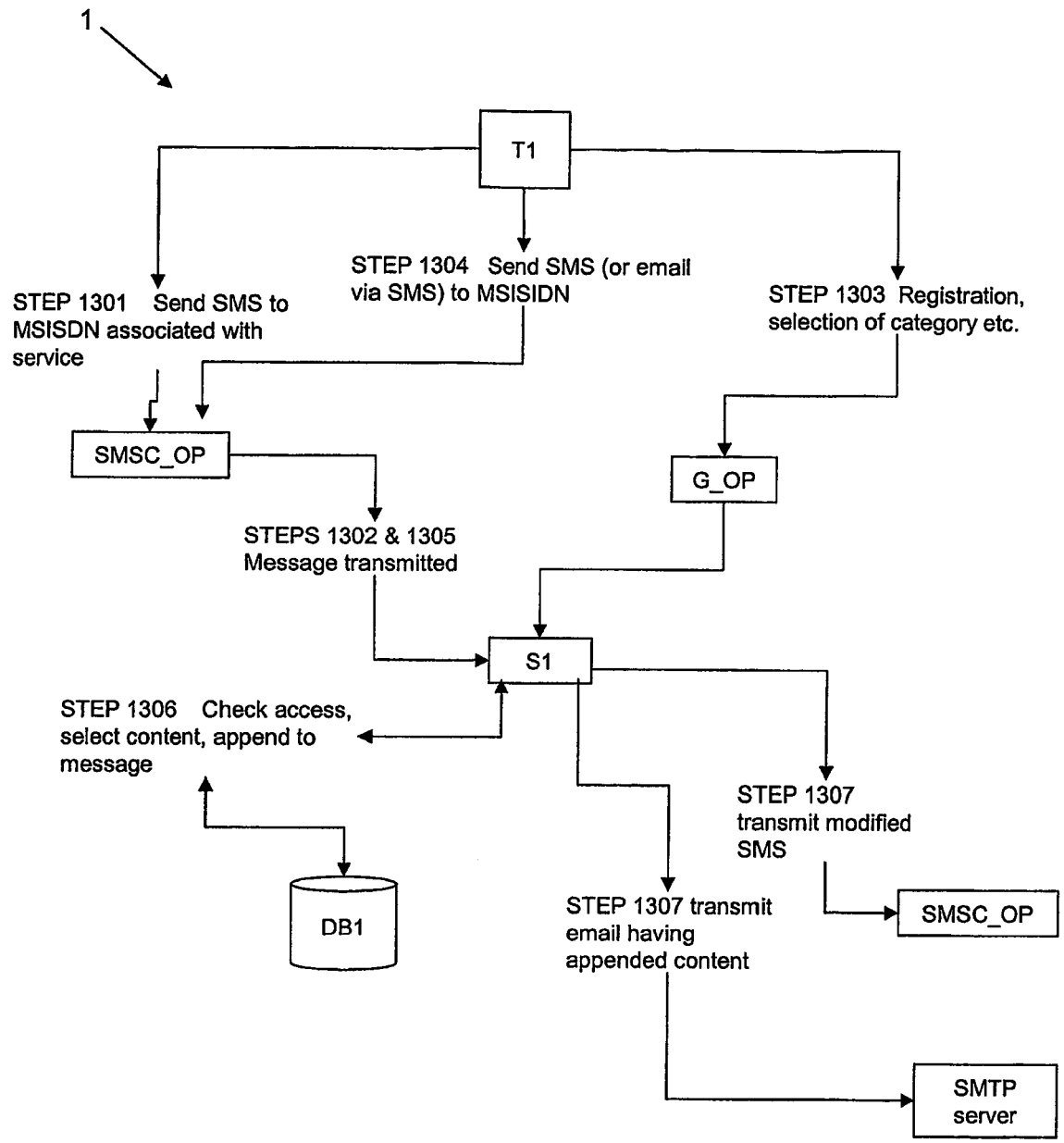
FIG. 13 is a schematic illustration of an alternative configuration of components of a mobile network according to a fourth embodiment of the present invention.

FIG. 13 shows a yet further arrangement of the data messaging service 1 that is suitable for sending SMS or email messages that have emanated as SMS messages. In this arrangement, registering with the message modification service involves firstly sending an SMS to a number associated with the service (steps 1301, 1302), then logging into a web page associated with the service in order to enter the various user details required by the service (step 1303). In this arrangement the selecting software 401 and message modification software 403 are stored on, and processed by, the WAP and Web services server S1, which thus additionally acts as a store-and-forward server.

Figure 14:
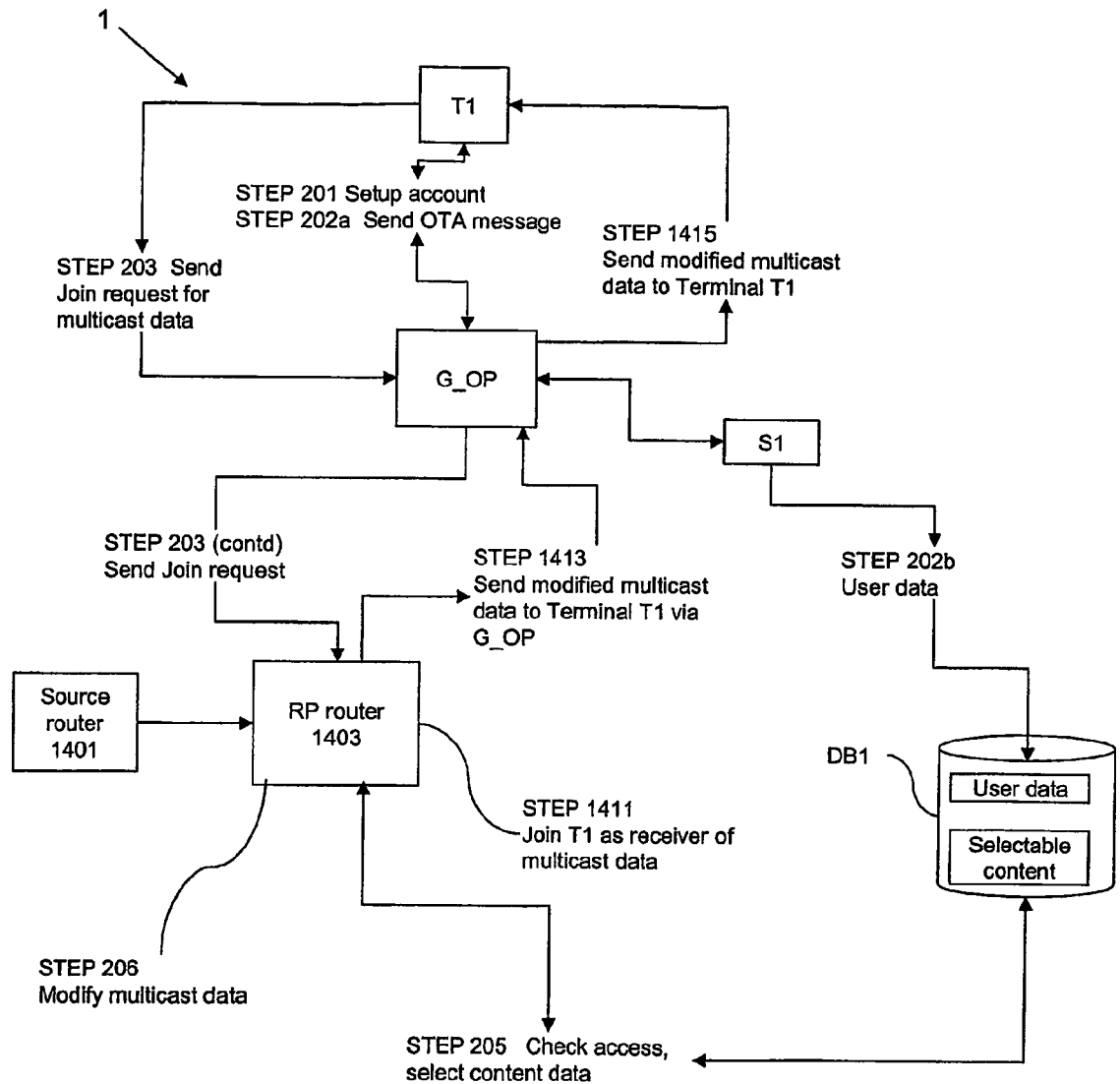
FIG. 14 is a schematic illustration of an alternative configuration of components of a mobile network according to a fifth embodiment of the present invention.

FIG. 14 shows a yet further arrangement of the data messaging service 1 that is suitable for sending multicast data to the terminal T1. In this arrangement, the subscriber registers with the service as described above, but the service is linked to a router in the network that is responsible for the distribution of multicast data to IP-enabled receivers. In the case where the multicast content provider is distributing its multicast content in accordance with PIM-Sparse mode protocol, there is a rendez-point router (shown as RP router 1401 in FIG. 14), which receives "Join" requests from receivers, and joins them to the distribution of multicast data emanating from the source (shown as source router 1403). In this arrangement a conventional RP router 1401 is modified so as to include the selecting software 401 and message modification software 403 as described for the other embodiments, which collectively add content data (steps 205, 206) to the multicast content. In this example the subscriber associated with terminal T1 is the recipient of the data and the source 1401 is the sender. For more information regarding the PIM Sparse Mode protocol, the reader is referred to "Multicast networking and applications", by C. Kenneth Miller, Published by Addison-Wesley, ISBN 0-201-30979-3.

Figure 15:
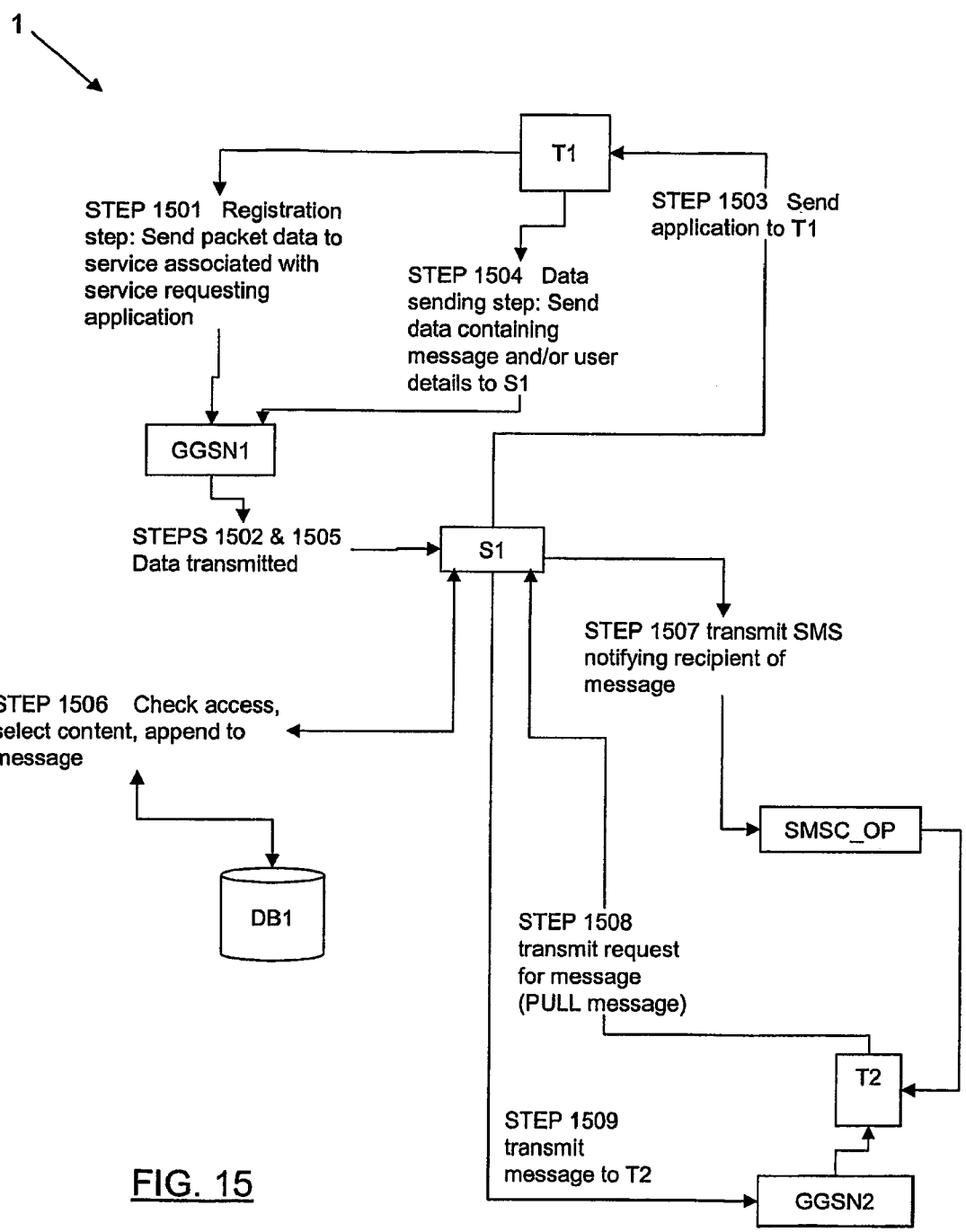
FIG. 15 is a schematic illustration of an alternative configuration of components of a mobile network according to a sixth embodiment of the present invention.

FIG. 15 shows another arrangement of the data messaging service 1 in which messages are sent to the server S1 via gateway GPRS support node GGSN 1 as data packets (steps 1504, 1505), and the server S1 modifies the message (step 1506). Having modified the message, the server S1 stores the same and sends a notifying SMS message (step 1507) to the recipient; in response to receipt of the notification message the terminal T2 has the opportunity to retrieve the stored message from the server S1 (steps 1508, 1509). In the arrangement shown in FIG. 15, an application is sent to the terminal T1 from the server S1 in response to receipt of a registration message (steps 1501, 1503) and both the user's demographic information and any subsequently composed messages are captured by the application and then sent onto the server S1 via GGSN1. It will be appreciated that the demographic data could instead by entered via a WAP page that is sent to the terminal T1 as described above in the context of the foregoing embodiments.

Figure 16:
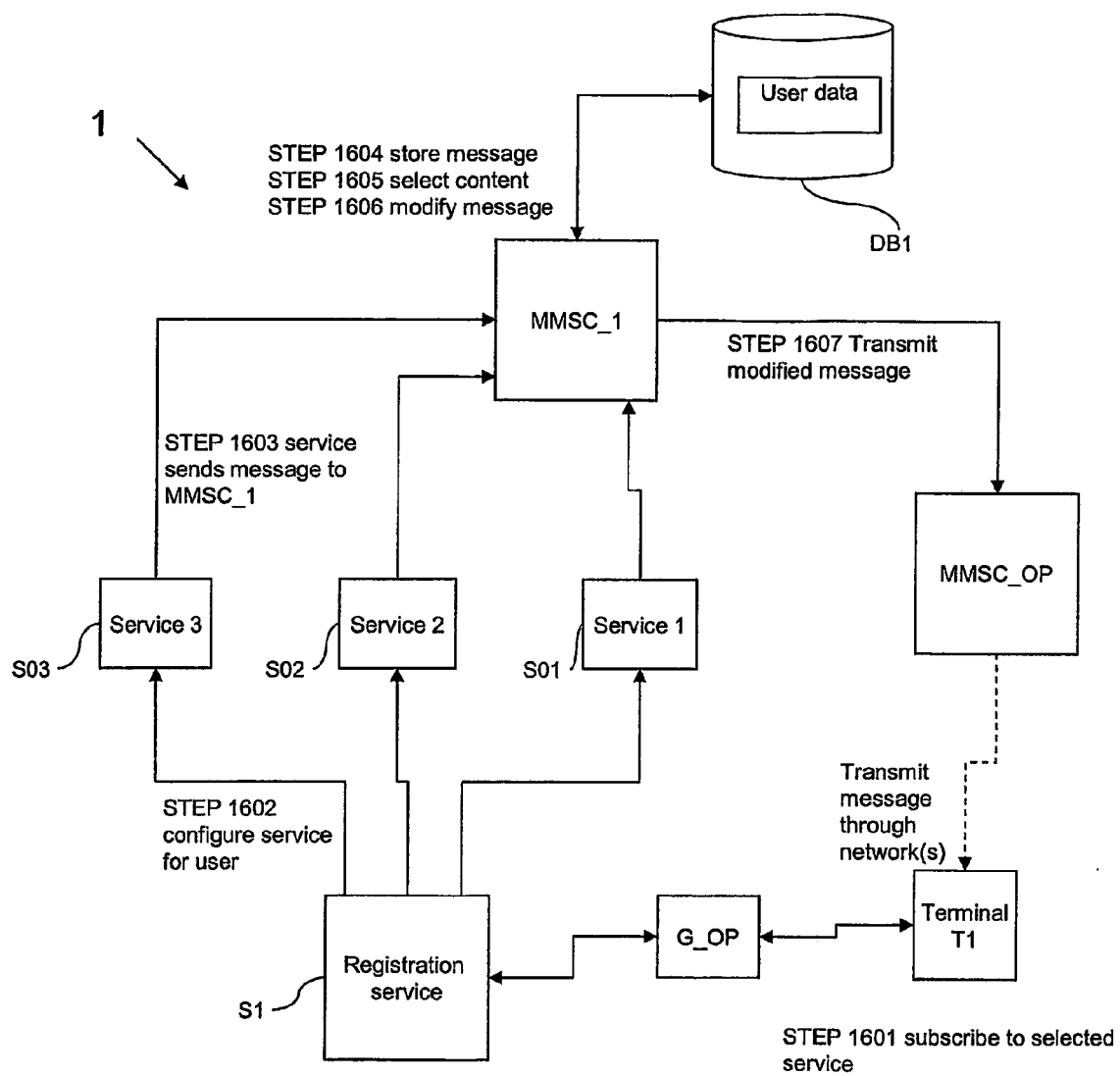
FIG. 16 is a schematic illustration of a first embodiment of components of a mobile network according to a second aspect of the present invention.

The foregoing embodiments describe arrangements for modifying messages emanating from individual subscribers. However, the invention can also be applied to modify data messages emanating from an information source, and a suitable arrangement for performing such a modification is shown in FIG. 16. Parts shown in FIG. 16 that are identical to those shown in FIGS. 1-15 are allocated identical reference numbers and identifiers and will not be described in any further detail; as for the figures relating to modification of personal messages, the arrows indicate data flows within the data messaging system 1 and the blocks indicate components thereof.

In this aspect of the invention messages typically originate from an information service provided by an automated software application running on a server connected to the network, which is generally referred to herein as a content provider. In the arrangement shown in FIG. 16, the data messaging system 1 comprises WAP gateway G_OP; a plurality of content servers S01, S02, S03 configured to generate and transmit messages to a terminal T1 in accordance with specified conditions; a services server S1 arranged to receive requests from the terminal T1 for content from one or more of the content servers S01, S02, S03; first and second store-and-forward message servers MMSC_1, MMSC_OP; and a database DB1, arranged to store data in respect of subscribers, terminal T1 and content data. Each of the content servers S01, S02, S03 is associated with a particular content provider.

In one arrangement the first message server MMSC_1, together with the services server S1, are arranged to operate inside an operator's network. The services server S1 handles requests for content data from the terminal T1 either on a per-request basis or on an on-going basis as specified by a user of the terminal T1 when subscribing to the content service, sending requests onto an appropriate one of the content servers S01, S02, S03 accordingly. The server S1 is also arranged to receive details of those users who have additionally subscribed to a message modification service according to an embodiment of the invention, and to this end is configured as, and operates in accordance with, the arrangement shown in FIG. 3.

Each content server S01, S02, S03 is configured in such a way that MMS messages destined for a subscriber to the message modification service are sent to the first message server MMSC_1 rather than to the second (network operator's main) message server MMSC_OP. Accordingly data identifying the address of the first message server MMSC_1 are configured in each of the content servers S01, S02, S03 so that MMS messages emanating therefrom are sent to the first message server MMSC_1 in the first instance. The steps involved in modifying a message by the data messaging system 1 will now be described, assuming that the user of Terminal T1 has placed a request with server S1 for data relating to estimated departure times of trains departing from London Victoria destined for Lyme Regis at 17:30. Assuming a request for this information to have been received by content server S01, a MMS message comprising this information is sent by the content server S01 at 17:30 (step 1603). At step 1604, the MMS message is received and stored by the proxy message server MMSC_1, in accordance with conventional techniques and at step 1605 the selecting software 401 selects content data from the database DB1 as described above with reference to FIG. 8. Once the content data have been selected, the message modification software 403 modifies, at step 1606, the MMS that was stored at step 1604 so as to include at least part of the selected content data and the modified MMS is transmitted to the network operator's message server MMSC_OP at step 1607, the message being subsequently delivered to the recipient (T1) in accordance with conventional methods.

Figure 17:
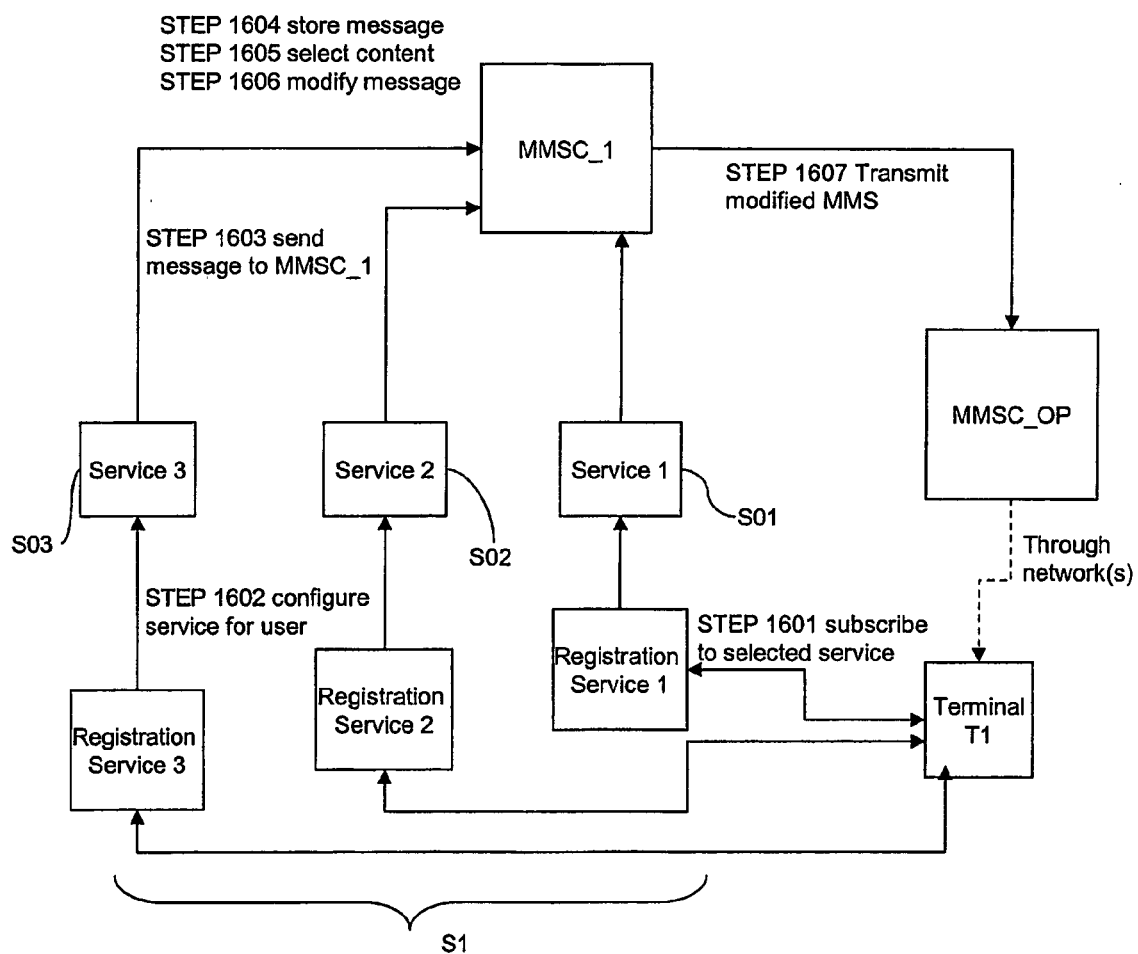
FIG. 17 is a schematic illustration of a second embodiment of components of a mobile network according to a second aspect of the present invention.

As shown in FIG. 16, the services server S1 is typically managed by the network operator, whilst the content servers S01, S02, S03 are managed by third parties. However, each content server S01, S02, S03 can have a services server associated therewith, in which case both the service server S1 and the content server will be managed by third parties; such an arrangement is shown in FIG. 17. Whilst in the first aspect of the invention settings corresponding to the proxy message server MMSC_1 are sent via an OTA message to user terminals (since this is where the messages originate), in embodiments according to this second aspect of the invention (where messages originate from content servers S01, S02, S03) the content servers could be notified of the settings, e.g. via an email or SMS message and automatically change their proxy server settings in response to receipt thereof.

It is to be noted that, whilst in the embodiments above the content data are branded media content, the invention could be applied to many other types of content data. For example, a service according to the invention may be used in tracking the eventual super-distribution of multimedia content across different operators, in which case special tags (e.g. in SMIL files and watermarks in multimedia files), each being associated with an operator, could be used.

The invention claimed is:

1. A computer implemented method comprising:
    receiving, by a processor, a message sent through a data communications network, the message including transmission data identifying a recipient destinations of the message and a message body identifying content thereof which is specified by a sending party, the message further being associated with a tag, wherein the tag is not directly related to the content of the message;
    identifying, by the processor, a recipient of the message on the basis of the transmission data for message modification;
    reviewing, by the processor, a schedule identifying entertainment activities, wherein the schedule is accessed from an electronically available entertainment listing;
    selecting, by the processor, in response to receiving the message, data in accordance with an entertainment activity that overlaps, at least in part, with a time of transmission or reception of the message an advertisement corresponding to the tag, provided the recipient of the message has not opted out from receiving advertisements corresponding to the tag;
    creating, by the processor, a modified message including the data selected in accordance with an entertainment activity that overlaps, at least in part, with a time of transmission or reception of the message; and
    transmitting, by the processor, the modified message to the destination advertisement to the recipient.

2. The computer implemented method of claim 1, wherein the advertisement data is selected from a store of selectable data.

3. The computer implemented method of claim 2, wherein the store is one of a plurality of stores, each store being associated with a different subject and each having selectable data therein, and wherein an identifier identifying one of the subjects has been received prior to receipt of the message, the identifier thereby identifying a store from which data are to be selected.

4. The computer implemented method of claim 2, wherein the selectable data are specified in advance of receipt of the message.

5. The computer implemented method of claim 1, wherein the data are selected in accordance with data associated with the message.

6. The computer implemented method of claim 1, wherein the data is selected from advertising data.

7. The computer implemented method of claim 1, wherein the selection of data is performed on the basis of a parameter that is not directly related to the location of the sending party.

8. The computer implemented method of claim 1, wherein the data is selected on the basis of characteristics of the identified recipient, and wherein the characteristics include any of location, context, weather, age, and preference information associated with the recipient.

9. The computer implemented method of claim 1, wherein, in response to identifying from the transmission data that there is a plurality of recipients of the message, identifying characteristics common to at least two of the recipients, and selecting data on the basis of the common characteristics.

10. The computer implemented method of claim 1, further comprising:
comparing the selected data with data identifying subject matter that the recipient is not interested in, and, in the event that the selected data matches data corresponding to the identified subject matter, the message is not modified prior to transmission to the recipient.

11. The computer implemented method of claim 1, further comprising:
recording the data that have been included in the transmitted messages;
comparing the recorded data with the data selected for inclusion in the message; and
repeating, in the event that the recorded data match the selected data, the element of selecting.

12. The computer implemented method of claim 1, wherein the data is selected based on location data.

13. The method of claim 1, further comprising:
receiving a subscription request at a messaging service from the recipient indicating that the recipient desires to receive advertisements from the messaging service.

14. The method of claim 1, wherein the tag is specified by the sending party.

15. The method of claim 14, further comprising:
receiving, from the sending party, at a messaging service, prior to receiving the message, a selection of tags to be associated with further messages.

16. A system comprising:
a receiver configured to receive a message sent through a data communications network, the message including transmission data identifying a recipient destinations of the message and a message body identifying content thereof which is specified by a sending party, the message further being associated with a tag, wherein the tag is not directly related to the content of the message;
a selector configured to review a schedule identifying entertainment activities, the selector further configured to select, in response to receiving the message, data in accordance with an entertainment activity that overlaps, at least in part, with a time of transmission or reception of the message an advertisement corresponding to the tag, provided the recipient of the message has not opted out from receiving advertisements corresponding to the tag, wherein the schedule is accessed from an electronically available entertainment listing; and
a message modifier configured to identify a recipient of the message on the basis of the transmission data for message modification and create a modified message including the data selected in accordance with an entertainment activity that overlaps, at least in part, with a time of transmission or reception of the message, the message transmitter further configured to transmit the modified message to the destination advertisement to the recipient.

17. The system of claim 16, further comprising:
a store of selectable data advertisements, wherein the selector selects the data advertisements from the store of selectable advertisements data.

18. The system of claim 17, wherein the store is one of a plurality of stores, each store being associated with a different subject and each having selectable data therein, and wherein an identifier identifying one of the subjects has been received prior to receipt of the message, the identifier thereby identifying a store from which data are to be selected.

19. The system of claim 17, wherein the selectable data are specified in advance of receipt of the message.

20. The system of claim 16, wherein the selector selects data in accordance with data associated with the message.

21. The system of claim 16, wherein the data is advertising data.

22. The system of claim 16, wherein the selector selects data on the basis of a parameter that is not directly related to the location of the sending party.

23. The system of claim 16, wherein the selector selects data based on characteristics of the identified recipient, and wherein the characteristics include any of location, context, weather, age, and preference information associated with the recipient.

24. The system of claim 16, wherein the selector is further configured to identify, in response to the message transmitter identifying from the transmission data that there is a plurality of recipients of the message, characteristics common to at least two of the recipients, and select data on the basis of the common characteristics.

25. The system of claim 16, wherein the message modifier is further configured to compare the selected data with data identifying subject matter that the recipient is not interested in, and, in the event that the selected data matches data corresponding to the identified subject matter, not modifying the message.

26. The system of claim 16, further comprising:
a recorder configured to record the data that have been included in the transmitted messages; and
wherein the selector is further configured to compare the recorded data with the data selected for inclusion in the message, and in the event that the recorded data match the selected data, select different data.

27. The system of claim 16, wherein the selector selects data based on location data.

28. The system of claim 16, wherein the receiver is further configured to receive a subscription request from the recipient indicating that the recipient desires to receive advertisements from the messaging service.

29. The system of claim 16, wherein the tag is specified by the sending party.

30. The system of claim 29, further comprising:
receiving, from the sending party, at a messaging service, prior to receiving the message, a selection of tags to be associated with further messages.

31. A non-transitory computer readable medium having instructions stored thereon for causing a computing device to perform a method comprising:
- receiving a message sent through a data communications network, the message including transmission data identifying a recipient destinations of the message and a message body identifying content thereof which is specified by a sending party, the message further being associated with a tag, wherein the tag is not directly related to the content of the message;
- identifying a recipient of the message on the basis of the transmission data for message modification;
- reviewing a schedule identifying entertainment activities, wherein the schedule is accessed from an electronically available entertainment listing;
- selecting, in response to receiving the message, data in accordance with an entertainment activity that overlaps, at least in part, with a time of transmission or reception of the message an advertisement corresponding to the tag, provided the recipient of the message has not opted out from receiving advertisements corresponding to the tag;
- creating a modified message including the data selected in accordance with an entertainment activity that overlaps, at least in part, with a time of transmission or reception of the message; and
- transmitting the modified message to the destination advertisement to the recipient.

32. The non-transitory computer readable medium of claim 31, further comprising:
- receiving a subscription request at a messaging service from the recipient indicating that the recipient desires to receive advertisements from the messaging service.

33. The non-transitory computer readable medium of claim 31, wherein the tag is specified by the sending party.

34. The non-transitory computer readable medium of claim 33, further comprising:
- receiving, from the sending party, at a messaging service, prior to receiving the message, a selection of tags to be associated with further messages.

* * * * *